US010089064B2

(12) United States Patent
Woolstenhulme et al.

(10) Patent No.: US 10,089,064 B2
(45) Date of Patent: Oct. 2, 2018

(54) AUDIO SYSTEMS AND RELATED DEVICES AND METHODS

(71) Applicant: Bose Corporation, Framingham, MA (US)

(72) Inventors: Clark Don Woolstenhulme, Cambridge (GB); David A. Howley, Franklin, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 15/413,895

(22) Filed: Jan. 24, 2017

(65) Prior Publication Data

US 2018/0210696 A1 Jul. 26, 2018

(51) Int. Cl.

| | |
|---|---|
| ***G06F 17/00*** | (2006.01) |
| ***G06F 3/16*** | (2006.01) |
| ***H04R 3/00*** | (2006.01) |
| *G08C 23/04* | (2006.01) |

(52) U.S. Cl.

CPC ............... *G06F 3/165* (2013.01); *H04R 3/00* (2013.01); *G08C 23/04* (2013.01); *H04R 2420/07* (2013.01)

(58) Field of Classification Search

CPC ...................................................... G06F 3/165

See application file for complete search history.

(56) References Cited

U.S. PATENT DOCUMENTS 6,359,661 B1 * 3/2002 Nickum ................. H04B 1/202 348/734
7,111,320 B1 * 9/2006 Novak ................... G08C 17/02 348/734
9,330,169 B2 5/2016 Gomes-Casseres et al.
2016/0007115 A1 * 1/2016 Kouthoofd ............... H04R 3/12 381/77

* cited by examiner

*Primary Examiner* — Joseph Saunders, Jr.
(74) *Attorney, Agent, or Firm* — Hoffman Warnick LLC

(57) ABSTRACT

An audio playback device includes a housing, an electroacoustic driver, and a wireless receiver capable of receiving first and second signals from respective first and second remote control devices. The first signal includes an identification of the first remote control device and an identification of the selected one of the first plurality of preset indicators. The second signal includes an identification of the second remote control device and an identification of the selected one of the second plurality of preset indicators. In response to receiving one of the first and second signals, the playback device is configured to use both the identification of the corresponding remote control device as well as the identification of the selected one of the corresponding plurality of preset indicators in the received signal to select an audio source.

18 Claims, 6 Drawing Sheets

AUDIO SYSTEMS AND RELATED DEVICES AND METHODS

BACKGROUND

This disclosure relates to audio systems and related devices and methods, and, particularly, to managing (e.g., synchronizing) presets among users in an audio system.

SUMMARY

All examples and features mentioned below can be combined in any technically possible way.

In general, in one aspect, an audio system includes a first remote control device including a first housing, a first wireless transmitter, a first controller, and a first plurality of preset indicators which can each be operated by a user of the first remote control device to identify an audio source. The first remote control device is configured such that in response to a user's selection of one of the first plurality of preset indicators, the controller causes the first transmitter to transmit a first signal which includes an identification of the first remote control device and an identification of the selected one of the first plurality of preset indicators. A second remote control device includes a second housing, a second wireless transmitter, a second controller, and a second plurality of preset indicators which can each be operated by a user of the second remote control to identify an audio source. The second remote control device is configured such that in response to a user's selection of one of the second plurality of preset indicators, the second controller causes the second wireless transmitter to transmit a second signal which includes an identification of the second remote control device and an identification of the selected one of the second plurality of preset indicators. An audio playback device includes a wireless receiver capable of receiving the first and second signals. In response to receiving one of the first and second signals, the playback device is configured to use both the identification of the corresponding remote control device as well as the identification of the selected one of the corresponding plurality of preset indicators in the received signal to select an audio source.

Implementations may include one or more of the following, in any combination. The first remote control includes a visual identifier which identifies the first remote control. The second remote control includes a visual identifier which identifies the second remote control. The first and second wireless transmitters are each infra-red transmitters. The first plurality of preset indicators each include a number. The second plurality of preset indicators each include a same number as a corresponding preset indicator in the first plurality of preset indicators. The shape of the first remote control is substantially the same as the shape of the second remote control. The audio system has an audio source associated with each of one or more of the preset indicators of the first remote control device pre-stored on the audio system by a manufacturer of the audio system. The audio source is part of an audio-video program that can be played by the audio playback device and an associated video display device.

In general, in another aspect, an audio playback device includes a housing, an electroacoustic driver, and a wireless receiver capable of receiving first and second signals from respective first and second remote control devices. The first signal is issued by a wireless transmitter of the first remote control device in response to a user's selection of one of a first plurality of preset indicators of the first remote control to identify an audio source. The first signal includes an identification of the first remote control device and an identification of the selected one of the first plurality of preset indicators. The second signal is issued by a wireless transmitter of the second remote control device in response to a user's selection of one of a second plurality of preset indicators of the second remote control to identify an audio source. The second signal includes an identification of the second remote control device and an identification of the selected one of the second plurality of preset indicators. In response to receiving one of the first and second signals, the playback device is configured to use both the identification of the corresponding remote control device as well as the identification of the selected one of the corresponding plurality of preset indicators in the received signal to select an audio source.

Implementations may include one or more of the above and below features in any combination. An audio source associated with each of one or more of the preset indicators of the first remote control device is pre-stored by a manufacturer of the audio playback device.

In general, in yet another aspect, a remote control device includes a first housing, a first wireless transmitter, a first controller, and a first plurality of preset indicators which can each be operated by a user of the remote control device to identify an audio source. The remote control device is configured such that in response to a user's selection of one of the plurality of preset indicators, the controller causes the transmitter to transmit a first signal which includes an identification of the remote control device and an identification of the selected one of the first plurality of preset indicators. An audio playback device includes a wireless receiver that is capable of receiving the first signal and a second signal from an additional remote control device. The second signal is issued by a second wireless transmitter of the additional remote control device in response to a user's selection of one of a second plurality of preset indicators of the additional remote control to identify an audio source. The second signal includes an identification of the additional remote control device and an identification of the selected one of the second plurality of preset indicators. In response to receiving one of the first and second signals, the playback device is configured to use both the identification of the corresponding remote control device as well as the identification of the selected one of the corresponding plurality of preset indicators in the received signal to select an audio source.

Implementations may include one or more of the above and below features in any combination. An audio source associated with each of one or more of the preset indicators of the remote control device is pre-stored by a manufacturer of the remote control.

DETAILED DESCRIPTION

This disclosure is based, at least in part, on the realization that it can be beneficial to have one or more presets which are identified with a particular remote control. This feature can help to facilitate quick and easy access to a user's preferred audio content.

Figure 1:
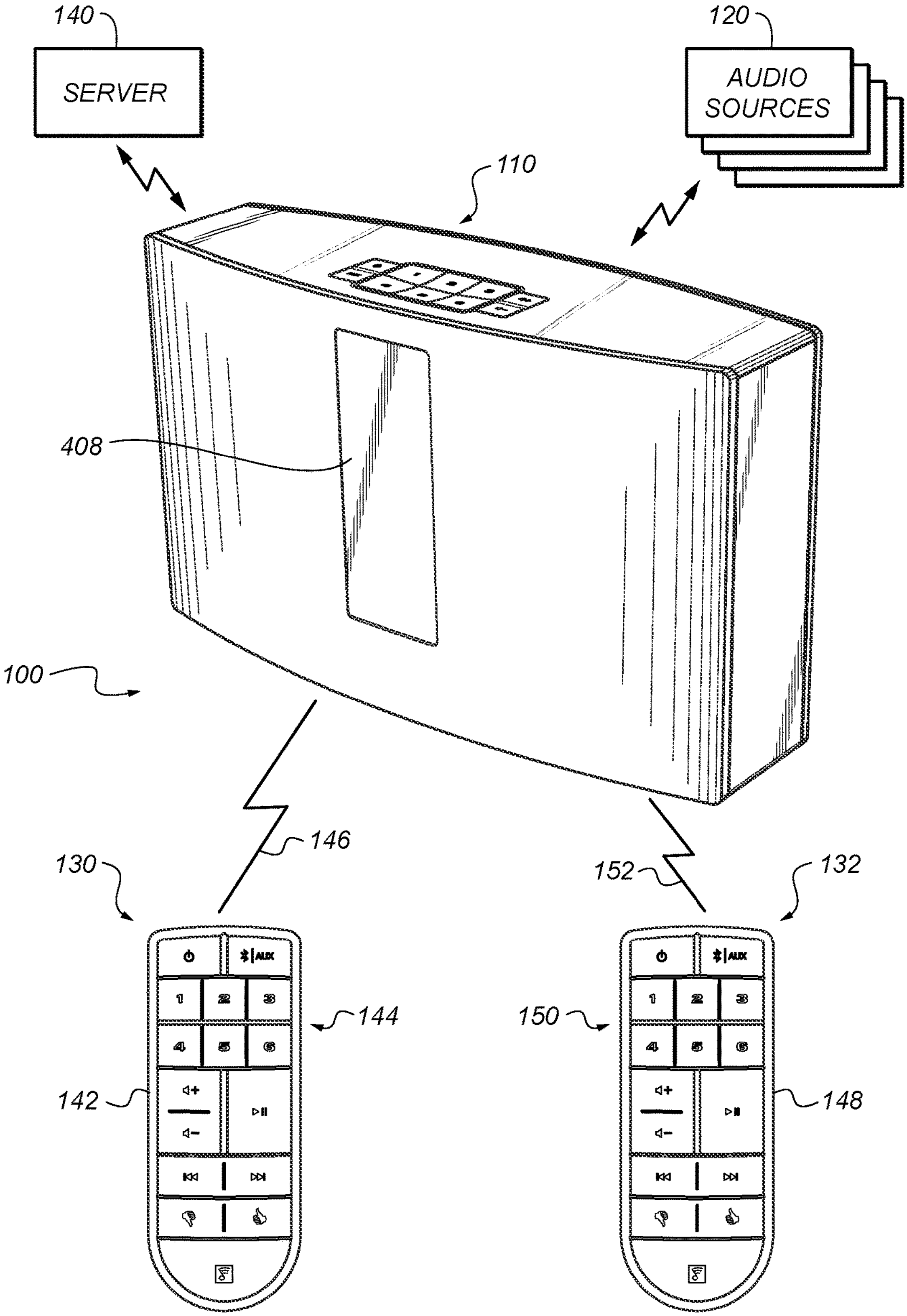
FIG. 1 is a schematic view of an audio system that facilitates of presets among various remote control devices.

Referring to FIG. 1, an audio system 100 for the delivery of digital audio (e.g., digital music) provides for easy, quick access to a variety of digital audio sources through the use of preset assignments. At a very high level, there are four main categories of devices in the audio system 100: (i) at least one audio playback device 110; (ii) digital audio sources 120*a*, 120*b*, 120*c* (collectively referenced as 120); (iii) a plurality of remote control devices 130, 132, and (iv) a server 140.

The audio playback device 110 is an electronic device which is capable of rendering audio content. This device can access stored audio content (e.g., remotely stored audio content) and stream it for playback. In some cases, the audio playback device 110 may also be capable of playing locally stored content. The audio playback device 110 render audio with the help of audio codecs and digital signal processors (DSPs) available within.

In some implementations, the audio playback device 110 can communicate with one or more other audio playback devices (not shown) in the audio system 100. For example, in an audio system that includes a plurality of such audio playback devices, each audio playback device can communicate with the other audio playback devices within the audio system for synchronization. This can be a synchronization of device settings, such as synchronization of preset assignments, or, for synchronization of playback (e.g., such that all or a subset of the audio playback devices play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 120 is an Internet music service such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to the audio playback device 110. Typically, there are two models for this data movement, push and pull. The audio system 100 is capable of managing this audio (data) streaming in both fashions; descriptions of these processes are as follows.

In a push model, the digital audio source 120 will move the data to the audio playback device 110 at a pace that it desires. The recipient (e.g., one of the audio playback devices 110) of the data will acknowledge the data and the digital audio source 120 will provide more data. This model requires the digital audio source 120 to be managing the throughput characteristics of the audio system 100. In a pull model, the audio playback device 110 will request data from the digital audio source 120 at a rate it desires. This allows the audio playback device 110 to read ahead if data is available.

The digital audio sources 120 each maintain a repository of audio content which can be chosen by the user to play. The digital audio sources 120 can be based on the Digital Living Network Alliance® (DLNA) or other Web based protocols similar to the Hypertext Transfer Protocol (HTTP). Some of the devices and services in this category include Internet based music services 120*a* such as Pandora®, Spotify®, and vTuner®; network-attached storage (NAS) devices 120*b*, and a media server daemon 120*c* (e.g., provided as a component of a computer-based controller).

The digital audio sources 120 include user defined playlists of digital music files available from network audio sources such as network-attached storage (NAS) devices 120*b*, and a DLNA server 120*c* which may be accessible to the audio playback devices 110 over a local area network such as a wireless (Wi-Fi) or wired (Ethernet) home network, as well as Internet radio sites 120*a* such as Pandora®, vTuner®, Spotify®, etc., which are accessible to the audio playback devices 110 over a wide area network such as the Internet.

The remote control devices 130, 132 communicate wirelessly (e.g., via infrared (IR) communication) with the audio playback device 110. The remote control devices 130, 132 may be used for: selecting a preset on the audio playback device 110 for playback of associated content; setting of preset assignments on the audio playback device 110; and transport control (play/pause, etc.) of the audio playback device.

The server 140 is a cloud-based server which contains (e.g., within an account database) information related to a user's audio system account. This includes user account information such as a list of the audio playback devices 110 within the system 100, device diagnostic information, preset assignments, etc. As described in greater detail in co-owned U.S. Pat. No. 9,330,169 "AUDIO SYSTEMS AND RELATED DEVICES AND METHODS," which is incorporated herein by reference in its entirety for all purposes, the server 140 will be connected to by the audio playback device 110 for the purpose of preset management, as well as management of audio sources 120 and management of the user's audio system account.

Notably, the audio system 100 can provide for the management of presets (a/k/a preset assignments). Presets are a set of (e.g., six) user-defined shortcuts to content, intended to provide quick access to entities associated with the digital music sources 120 from (1 of 6) preset indicators present on the audio playback device 110 as well as on the remote control devices 130, 132. In some cases, the preset indicators can be hardware buttons. Alternatively, the preset indicators may be virtual buttons defined by regions on a touch sensitive display. The individual preset indicators can be denoted with numerical identifiers.

The preset indicators provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source.

In a household with plural users, the users may have different tastes in music. To accommodate these different tastes, plural sets of preset assignments may be stored on the audio playback device 110 and/or on the server 120 to allow each user to have their own set of preset assignments. Individual users can then each have their own remote control device that transmits a unique identifier to the audio playback device 110, such as when a command is sent to the audio playback device 110. This can allow the audio playback device 110 to identify the user and utilize that user's particular set of preset assignments when a preset indicator is selected via that user's remote control device.

Figure 2:
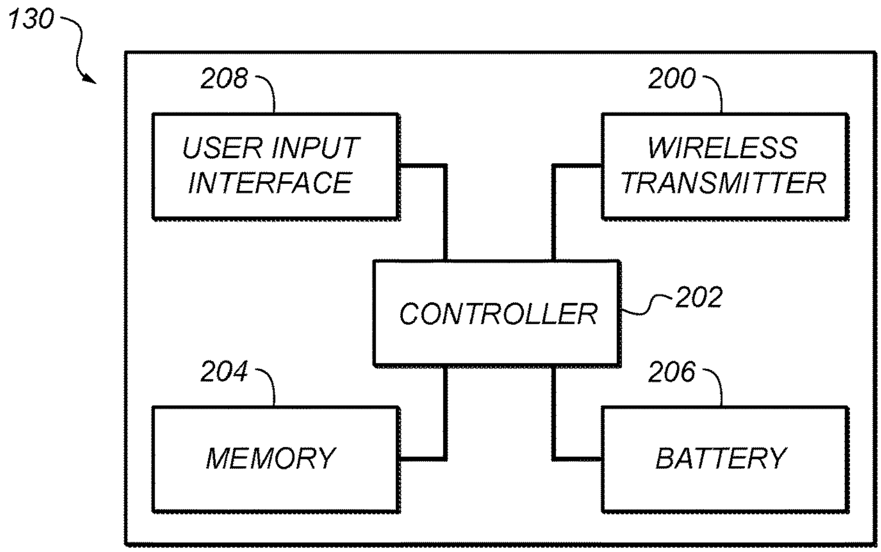
FIG. 2 is a block diagram of either remote control device of FIG. 1.

Referring to FIGS. 1 and 2, the plurality of remote control devices 130, 132 includes a first remote control device 130 having a first housing 142 and a first wireless transmitter 200. The wireless transmitter 200 in this example is an infra-red (i.e. IR) transmitter, but could be another type of wireless transmitter such as a radio frequency transmitter. The first remote control device 130 also includes a first controller 202, a memory 204, one or more batteries 206, and a first plurality of preset indicators 144 which can each be operated by a user of the first remote control device to identify an audio source. The first plurality of preset indicators 144 and other controls (e.g. "AUX", play/pause) on the first remote control device connect to a user input interface 208.

To initially program a preset indicator 144, a user causes an audio source to play on an audio playback device 110 after which they press and hold, for example, the "1" preset indicator 144. This causes that audio source to be associated with the "1" preset indicator 144 of the first remote control device 130. The first remote control device 130 is configured such that, in response to a user's selection of one of the first plurality of preset indicators 144 (e.g. control "1"), the controller 202 causes the first transmitter 200 to transmit a first signal 146 which includes an identification of the first remote control device 130 and an identification of the selected one of the first plurality of preset indicators 144 (e.g. control "1"). The audio playback device 110 will receive this first signal 146 and start to play the audio source that was programmed on the "1" preset indicator 144 of the first remote control device 130.

A second remote control device 132 includes a second housing 148 and a second wireless transmitter. The second remote control device 132 also includes all of the elements shown in FIG. 2. The second wireless transmitter in this example is an infra-red transmitter, but could be another type of wireless transmitter such as a radio frequency transmitter. The second remote control device 132 also includes a second controller and a second plurality of preset indicators 150 which can each be operated by a user of the second remote control to identify an audio source. In this example the shape of the first remote control 130 is substantially the same as the shape of the second remote control 132. Also, the first plurality of preset indicators 144 each include a number (e.g. "1") and the second plurality of preset indicators 150 each include a same number as a corresponding preset indicator in the first plurality of preset indicators.

To initially program a preset indicator 150, a user causes an audio source to play on the audio playback device 206 after which they press and hold, for example, the "1" preset indicator 150. This causes that audio source to be associated with the "1" preset indicator 150 of the first remote control device 132. The second remote control device 132 is configured such that, in response to a user's selection of one of the second plurality of preset indicators 150, the second controller causes the second wireless transmitter to transmit a second signal 152 which includes an identification of the second remote control device and an identification of the selected one of the second plurality of preset indicators 150.

The signals 146 and 152 each identify their particular remote control and preset indicator that was operated by a user by, for example, varying the amplitude and/or frequency of the signal. For example, a header of a signal might identify a particular remote control, and a later portion of that signal might identify which preset on the identified remote control was operated by a user.

The audio playback device 110 includes a wireless receiver 400 (FIG. 4C) capable of receiving the first and second signals 146 and 152. In response to receiving one of the first and second signals 146 and 152, the playback device 110 is configured to use both the identification of the corresponding remote control device 130 or 132 as well as the identification of the selected one of the corresponding plurality of preset indicators (e.g. control "1" on remote control device 130) in the received signal to select an audio source. Preset indicator "1" on remote control 130 can identify an audio source that is different from the audio source that is identified by preset indicator "1" on remote control 132.

Figure 3:
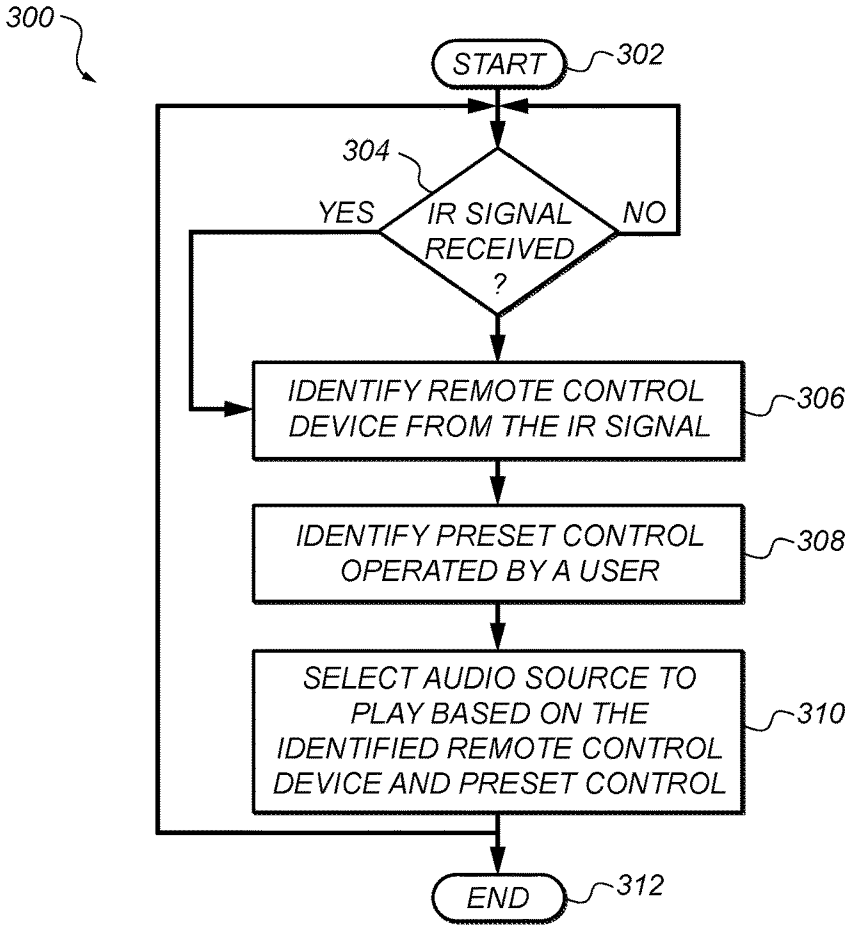
FIG. 3 is a logic flow diagram for software that controls audio source selection based on operation of a preset indicator on one of the remote controls of FIG. 1.

Referring to FIGS. 1 and 3, a flow diagram 300 represents a software subroutine that can be stored in memory (e.g. memory 402 of FIG. 4C) and run on a processor (e.g. processor 404). The subroutine starts at a step 302 when, for example, the audio playback device 110 is powered on. At a step 304 the logic checks to see if an IR signal has been received by the wireless receiver 400. When an IR signal has been received, the logic identifies the remote control device (e.g. device 130) at a step 306. The logic then identifies a preset indicator at a step 308 that has been operated by a user on the identified remote control device. Finally, at a step 310 the logic selects an audio source to play based on the identified remote control device and the operated preset indicator. The subroutine ends at a step 312 when for example, the audio playback device 110 is powered off.

Referring to FIGS. 1, 2 and 3, the first and second remote control devices 130 and 132 can each include a visual identifier which identifies a particular remote control. The visual identifier can be, for example, color. A substantial portion of remote control 130 can be red, and a substantial portion of remote control 132 can be blue. This allows a couple to have their own remote control which they can quickly identify by the visual indicator. As such, when a person walks into a room, they can quickly grab their remote control and access one of their audio sources by pressing a preset indicator. The remote control devices can be sold in packs of two or more per package, thus allowing various sized households to provide at least one remote to each person in the household. In addition, a particular person might have their own remote control device in each room of the household where an audio playback device 110 is located.

The audio system 100 can have an audio source associated with each of one or more of the preset indicators 144 of the first remote control device 130 pre-stored on one or more of the audio system 100, the remote control device 130, and the audio playback device 110 by a manufacturer of the audio system, the remote control device 130, or the audio playback device 110. This allows the remote control device 130 to be sold when new with, for example, six jazz audio sources pre-stored. So a person who loves jazz can quickly get to some jazz audio sources shortly after the remote control device has been removed from its packaging. If the person doesn't like any of the pre-stored jazz audio sources, they can, of course, reprogram any of the preset indicators 144.

Figure 4A:
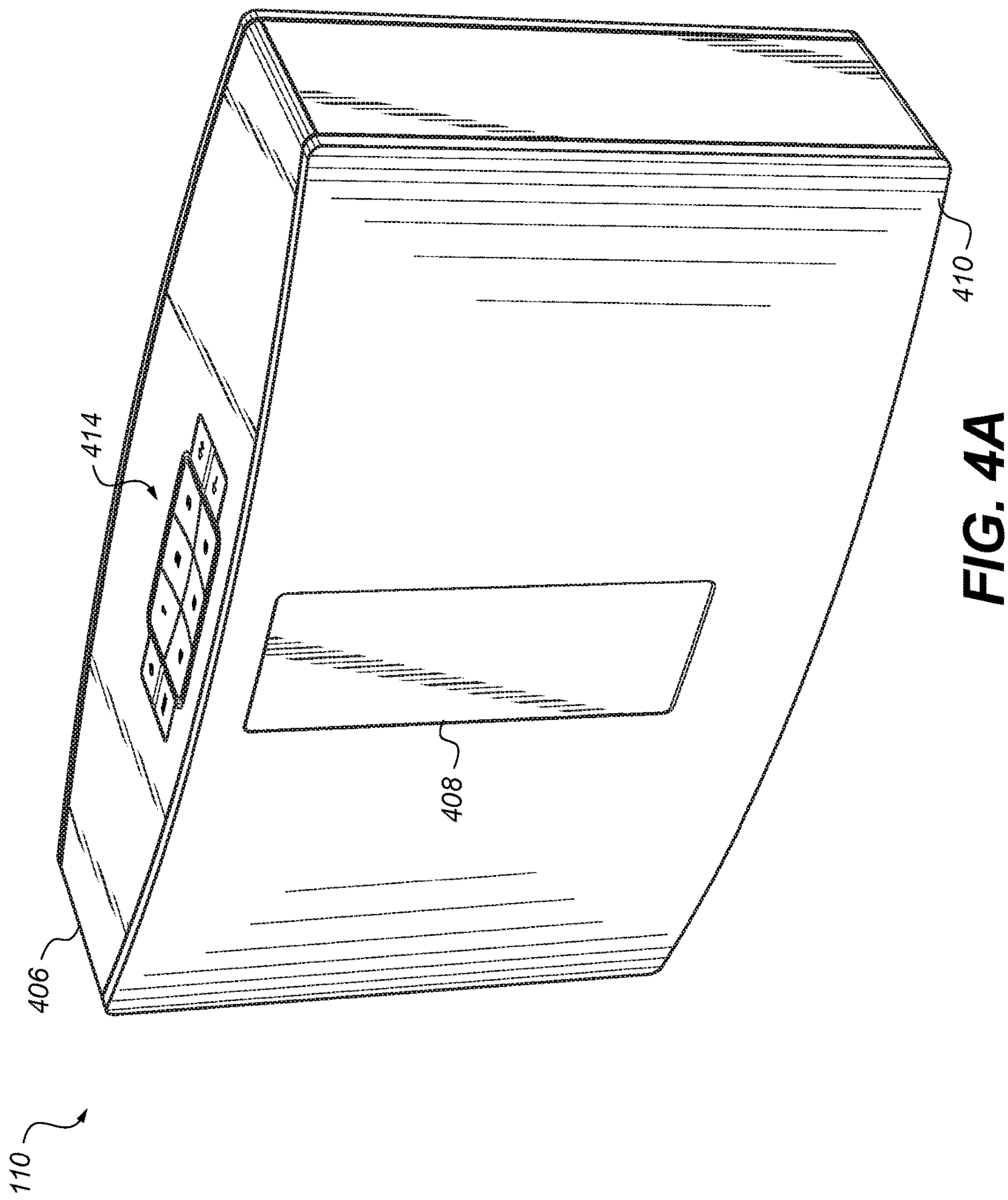
FIGS. 4A and 4B are perspective and top plan views, respectively, of an exemplary audio playback device from the audio system of FIG. 1.
Figure 4B:
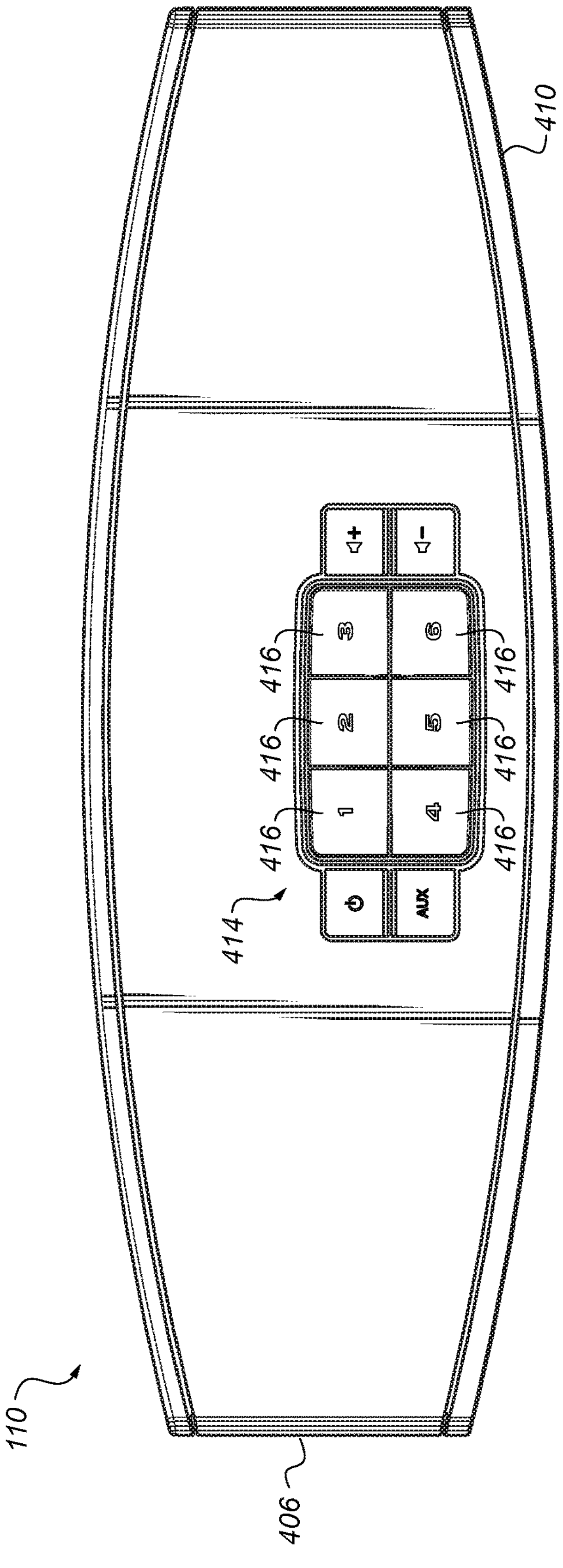
Figure 4C:
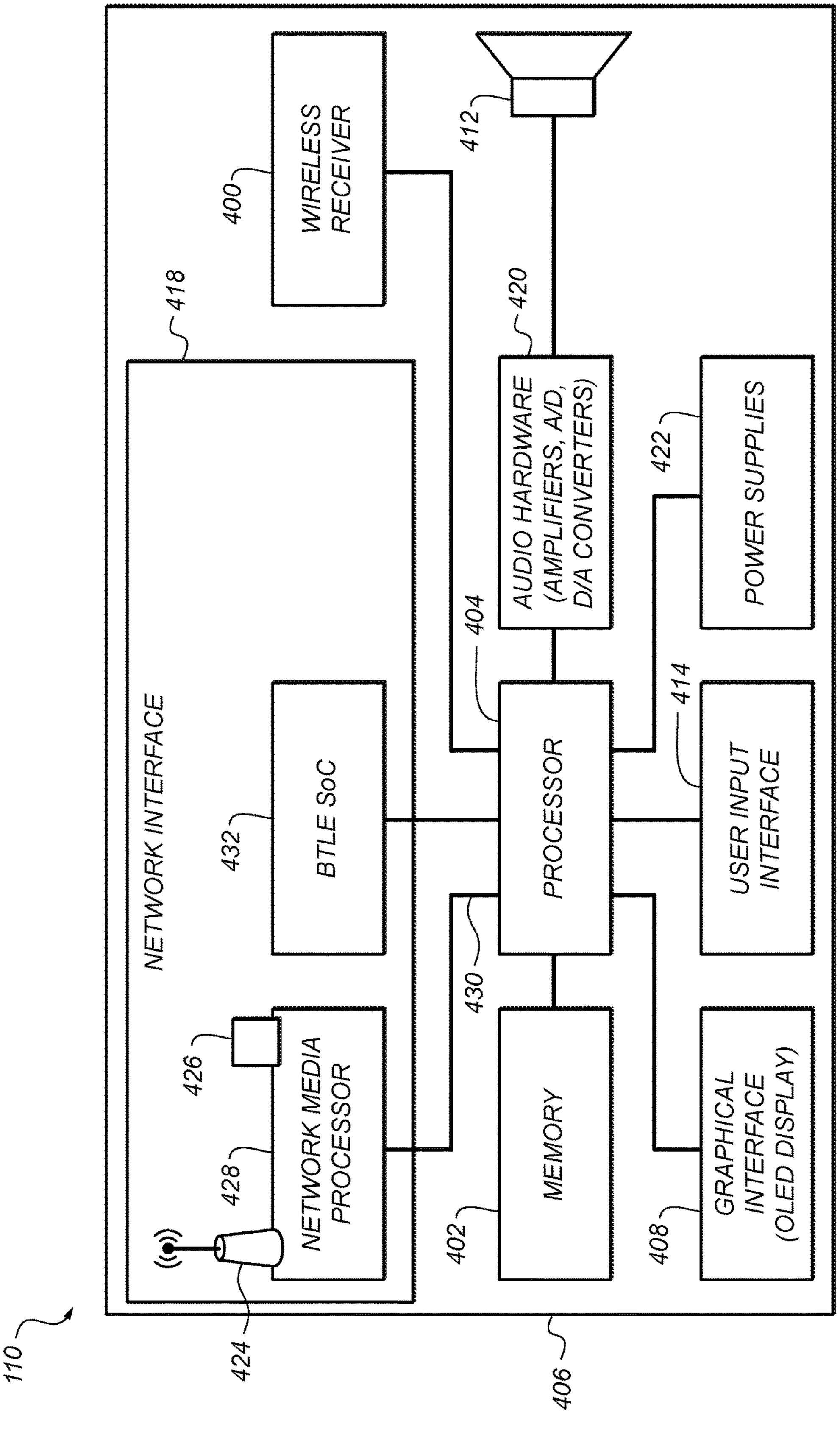
FIG. 4C is a block diagram of the audio playback device of FIG. 4A.

An exemplary audio playback device 110 will now be described in greater detail with reference to FIGS. 4A through 4C. Referring to FIG. 4A, an audio playback device 110 includes an enclosure 406 and on the enclosure 406 there resides a graphical interface 408 (e.g., an organic light emitting diode (OLED) display) which can provide the user with information regarding currently playing ("Now Playing") music and information regarding the presets. A screen 410 conceals one or more electro-acoustic transducers 412 (FIG. 4C). The audio playback device 110 also includes a user input interface 414. As shown in FIG. 4B, the user input interface 414 includes a plurality of preset indicators 416, which are hardware buttons in the illustrated example. The preset indicators 416 (numbered 1-6) provide the user with easy, one press access to entities assigned to those buttons. That is, a single press of a selected one of the preset indicators 416 will initiate streaming and rendering of content from the assigned entity.

The assigned entities can be associated with different ones of the digital audio sources (items 120*a*, 120*b*, 120*c*, FIG. 1) such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 416 operate in the same manner, at least from the user's perspective, regardless of which entities are assigned and which of the digital audio sources provide the assigned entities. That is, each preset indicator 416 can provide for single press access to its assigned entity whether that entity is a user-defined playlist of digital music provided by an NAS device or an Internet radio station provided by an Internet music service.

With reference to FIG. 4C, the audio playback device 110 also includes a network interface 418, a processor 404, audio hardware 420, power supplies 422 for powering the various audio playback device components, and memory 402. Each of the processor 404, the graphical interface 408, the network interface 418, the processor 404, the audio hardware 420, the power supplies 422, and the memory 402 are interconnected using various buses, and several of the components may be mounted on a common motherboard or in other manners as appropriate.

The network interface 418 provides for communication between the audio playback device 110 and the controller (e.g., items 130*a-c*, FIG. 1), the server (item 140, FIG. 1), the audio sources (items 120, FIG. 1) and other audio playback devices 110 via one or more communications protocols. The network interface 418 may provide either or both of a wireless interface 424 and a wired interface 426. The wireless interface 424 allows the audio playback device 110 to communicate wirelessly with other devices in accordance with a communication protocol such as such as IEEE 802.11 b/g. The wired interface 426 provides network interface functions via a wired (e.g., Ethernet) connection.

In some cases, the network interface 418 may also include a network media processor 428 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 150, the user can then stream music to the network connected audio playback devices 110 via Apple AirPlay®. A suitable network media processor is the DM870 processor available from SMSC of Hauppauge, N.Y. The network media processor 428 provides network access (i.e., the Wi-Fi network and/or Ethernet connection can be provided through the network media processor 428) and AirPlay® audio. AirPlay® audio signals are passed to the processor 404, using the $I^2S$ protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 428 through a USB bridge 430 to the processor 404 and runs into the decoders, DSP, and eventually is played back (rendered) via the electro-acoustic transducer(s) 412.

The network interface 406 can also include a Bluetooth low energy (BTLE) system-on-chip (SoC) 432 for Bluetooth low energy applications (e.g., for wireless communication with a Bluetooth enabled controller (item 130*c*, FIG. 1)). A suitable BTLE SoC is the CC2540 available from Texas Instruments, with headquarters in Dallas, Tex.

Streamed data pass from the network interface 418 to the processor 404. The processor 404 can execute instructions within the audio playback device (e.g., for performing, among other things, digital signal processing, decoding, and equalization functions), including instructions stored in the memory 402. The processor 404 may be implemented as a chipset of chips that include separate and multiple analog and digital processors. The processor 404 may provide, for example, for coordination of other components of the audio playback device 110, such as control of user interfaces, applications run by the audio playback device 110. A suitable processor is the DA921 available from Texas Instruments.

The processor 404 provides a processed digital audio signal to the audio hardware 420 which includes one or more digital-to-analog (D/A) converters for converting the digital audio signal to an analog audio signal. The audio hardware 420 also includes one or more amplifiers which provide amplified analog audio signals to the electroacoustic transducer(s) 412 for playback. In addition, the audio hardware 420 may include circuitry for processing analog input signals to provide digital audio signals for sharing with other devices in the acoustic system 100.

The memory 402 stores information within the audio playback device 110. In this regard, the memory 402 may store account information, such as the preset and recent information discussed above. The memory 402 may also provide storage for "tokens" for facilitating single press access to the digital audio sources 120 (e.g., the Internet radio services of FIG. 1). A token, as used herein, is a unique identifier that may be provided by the digital audio source 120 and which allows the digital audio source 120 to recognize the audio playback device 110 as being associated with a user's account with the digital audio source 120 and without requiring the user to enter credentials (e.g., user name, password, etc.) each time the audio playback device 110 attempts to access the digital audio source 120.

The memory 402 may include, for example, flash memory and/or non-volatile random access memory (NVRAM). In some implementations, instructions (e.g., software) are stored in an information carrier. The instructions, when executed by one or more processing devices (e.g., the processor 404), perform one or more processes, such as those described above (e.g., with respect to FIG. 3). The instructions can also be stored by one or more storage devices, such as one or more computer- or machine-readable mediums (for example, the memory 402, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130*a-c*, FIG. 1) serve as graphical remote controls for the audio playback devices 110 and do not communicate with the digital audio sources 120 (FIG. 1) directly, but, instead, communicate with the digital audio sources 120 via the audio playback devices 110.

In another example the OLED display 408 is reconfigured so that it can be operated as a video display device in addition to or instead of being operated as a graphical interface. In the former case the graphical interface information can be overlaid on top of any video information being displayed or shown in a different portion of the OLED display (e.g. video information displayed in a main portion of the display and graphical interface information displayed in a bottom slice of the OLED display). As such, the audio playback device 110 can function as, for example, a television or video monitor. In this case, the aspect ratio of the display would preferably be altered from what is shown in FIG. 1 to match common aspect ratios for video displays (e.g. 16:9, 4:3). Thus, an audio source that is part of an audio-video program can be played by the audio playback device 110 and an associated video display device 408. The video display device 408 can alternatively be a separate device in a separate housing from the audio playback device 110.

Figure 5:
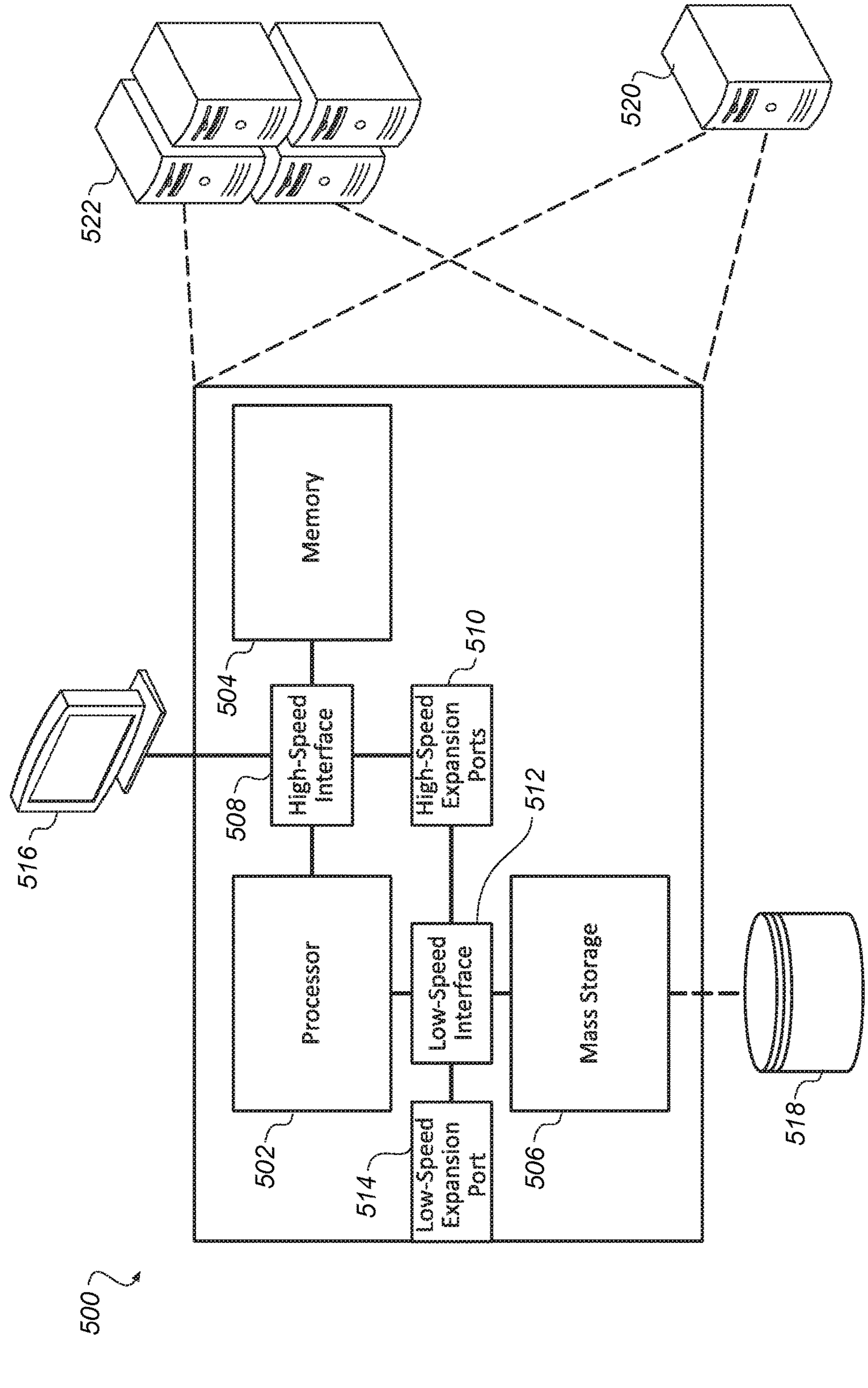
FIG. 5 is a block diagram of a computing device that can be used to implement the server of the audio system of FIG. 1.

FIG. 5 illustrates an exemplary computing device 500 that can be utilized to implement the server (item 140, FIG. 1). The computing device 500 is intended to represent various forms of digital computers, such as servers, blade servers, mainframes, and other appropriate computers. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512 are interconnected using various busses, and may be mounted on a common motherboard or in other manners as appropriate. The processor 502 can process instructions (e.g., a software program) for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more processes, such as those described above (e.g., with reference to one or more of FIGS. 1-5). The instructions can also be stored by one or more storage devices such as computer-readable mediums (for example, the memory 504, the storage device 506, or memory on the processor 502). The storage device 506 may provide storage for a database 518. The database can be used to store audio system account information.

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 514 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers 522. It may also be implemented as part of a rack server system.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. An audio system, comprising:

a first remote control device including a first housing, a first wireless transmitter, a first controller, and a first plurality of preset indicators which can each be operated by a user of the first remote control device to identify an audio source supplied by an associated entity, the first remote control device being configured such that, in response to a user's selection of one of the first plurality of preset indicators, the controller causes the first transmitter to transmit a first signal which includes an identification of the first remote control device and an identification of the selected one of the first plurality of preset indicators;

a second remote control device that includes a second housing, a second wireless transmitter, a second controller, and a second plurality of preset indicators which can each be operated by a user of the second remote control to identify an audio source supplied by the associated entity or a distinct associated entity, the second remote control device being configured such that, in response to a user's selection of one of the second plurality of preset indicators, the second controller causes the second wireless transmitter to transmit a second signal which includes an identification of the second remote control device and an identification of the selected one of the second plurality of preset indicators; and an audio playback device including a wireless receiver capable of receiving the first and second signals, wherein, in response to receiving one of the first and second signals, the playback device is configured to use both the identification of the corresponding remote control device as well as the identification of the selected one of the corresponding plurality of preset indicators in the received signal to select an audio source supplied by the associated entity or a distinct associated entity, wherein the identification of the corresponding remote control device is included in a header of the received signal, and the identification of the selected one of the corresponding plurality of preset indicators is included in a later portion of the received signal, wherein the first plurality of preset indicators and the second plurality of preset indicators identify at least one distinct audio source and each provide access to respectively assigned associated entities irrespective of the audio source.

2. The audio system of claim 1, wherein the first remote control includes a visual identifier which identifies the first remote control, and wherein the second remote control includes a visual identifier which identifies the second remote control as distinct from the first remote control.

3. The audio system of claim 1, wherein the first plurality of preset indicators each include a number and the second plurality of preset indicators each include a same number as a corresponding preset indicator in the first plurality of preset indicators.

4. The audio system of claim 1, wherein the audio system has an audio source associated with each of one or more of the preset indicators of the first remote control device pre-stored on the audio system by a manufacturer of the audio system.

5. The audio system of claim 1, wherein the audio source is part of an audio-video program that can be played by the audio playback device and an associated video display device.

6. The audio system of claim 1, wherein the audio playback device comprises a memory configured to store: information about the first plurality of preset indicators and associated audio sources, information about the second plurality of preset indicators and associated audio sources, and tokens for facilitating single press access to the associated audio sources from the first plurality of preset indicators and the second plurality of preset indicators, wherein each of the tokens comprises a unique identifier, wherein the audio playback device is further configured to provide one of the tokens to an associated audio source in response to receiving one of the first and second signals indicating the user selected one of the first plurality of preset indicators or one of the second plurality of preset indicators, wherein in response to receiving the token, the audio source recognizes the audio playback device as being associated with an account of the user with the audio source, and permits access to the audio source without requiring the user to enter credentials.

7. An audio playback device, comprising:

a housing;

an electroacoustic driver; and a wireless receiver capable of receiving first and second signals from respective first and second remote control devices, the first signal being issued by a wireless transmitter of the first remote control device in response to a user's selection of one of a first plurality of preset indicators of the first remote control to identify an audio source supplied by an associated entity, the first signal including an identification of the first remote control device and an identification of the selected one of the first plurality of preset indicators, the second signal being issued by a wireless transmitter of the second remote control device in response to a user's selection of one of a second plurality of preset indicators of the second remote control to identify an audio source supplied by the associated entity or a distinct associated entity, the second signal including an identification of the second remote control device and an identification of the selected one of the second plurality of preset indicators, wherein, in response to receiving one of the first and second signals, the playback device is configured to use both the identification of the corresponding remote control device as well as the identification of the selected one of the corresponding plurality of preset indicators in the received signal to select an audio source, wherein the identification of the corresponding remote control device is included in a header of the received signal, and the identification of the selected one of the corresponding plurality of preset indicators is included in a later portion of the received signal, wherein the first plurality of preset indicators and the second plurality of preset indicators identify at least one distinct audio source and each provide access to respectively assigned associated entities irrespective of the audio source.

8. The audio playback device of claim 7, wherein the first remote control includes a visual identifier which identifies the first remote control, and wherein the second remote control includes a visual identifier which identifies the second remote control as distinct from the first remote control.

9. The audio playback device of claim 7, wherein the first plurality of preset indicators each include a number and the second plurality of preset indicators each include a same number as a corresponding preset indicator in the first plurality of preset indicators.

10. The audio playback device of claim 7, wherein an audio source associated with each of one or more of the preset indicators of the first remote control device is pre-stored by a manufacturer of the audio playback device.

11. The audio playback device of claim 7, wherein the audio source is part of an audio-video program that can be played by the audio playback device and an associated video display device.

12. The audio playback device of claim 7, further comprising:

a memory configured to store: information about the first plurality of preset indicators and associated audio sources, information about the second plurality of preset indicators and associated audio sources, and tokens for facilitating single press access to the associated audio sources from the first plurality of preset indicators and the second plurality of preset indicators, wherein each of the tokens comprises a unique identifier, wherein the audio playback device is further configured to provide one of the tokens to an associated audio source in response to receiving one of the first and second signals indicating the user selected one of the first plurality of preset indicators or one of the second plurality of preset indicators, wherein in response to receiving the token, the audio source recognizes the audio playback device as being associated with an account of the user with the audio source, and permits access to the audio source without requiring the user to enter credentials.

13. A remote control device, comprising:

a first housing;

a first wireless transmitter;

a first controller; and a first plurality of preset indicators which can each be operated by a user of the remote control device to identify an audio source supplied by an associated entity, the remote control device being configured such that, in response to a user's selection of one of the plurality of preset indicators, the controller causes the transmitter to transmit a first signal which includes an identification of the remote control device and an identification of the selected one of the first plurality of preset indicators, wherein an audio playback device includes a wireless receiver that is capable of receiving the first signal and a second signal from an additional remote control device, the second signal being issued by a second wireless transmitter of the additional remote control device in response to a user's selection of one of a second plurality of preset indicators of the additional remote control to identify an audio source supplied by the associated entity or a distinct associated entity, the second signal including an identification of the additional remote control device and an identification of the selected one of the second plurality of preset indicators, wherein, in response to receiving one of the first and second signals, the playback device is configured to use both the identification of the corresponding remote control device as well as the identification of the selected one of the corresponding plurality of preset indicators in the received signal to select an audio source, wherein the identification of the corresponding remote control device is included in a header of the first signal and the second signal, and the identification of the selected one of the corresponding plurality of preset indicators is included in a later portion of the first signal and the second signal, wherein the first plurality of preset indicators and the second plurality of preset indicators identify at least one distinct audio source and each provide access to respectively assigned associated entities irrespective of the audio source.

14. The remote control device of claim 13, wherein the remote control includes a visual identifier which identifies the remote control, and wherein the additional remote control includes a visual identifier which identifies the additional remote control as distinct from the remote control.

15. The remote control device of claim 13, wherein the first plurality of preset indicators each include a number and the second plurality of preset indicators each include a same number as a corresponding preset indicator in the first plurality of preset indicators.

16. The remote control device of claim 13, wherein an audio source associated with each of one or more of the preset indicators of the remote control device is pre-stored by a manufacturer of the remote control.

17. The remote control device of claim 13, wherein the audio source is part of an audio-video program that can be played by the audio playback device and an associated video display device.

18. The remote control device of claim 13, wherein the audio playback device comprises a memory configured to store: information about the first plurality of preset indicators and associated audio sources, information about the second plurality of preset indicators and associated audio sources, and tokens for facilitating single press access to the associated audio sources from the first plurality of preset indicators and the second plurality of preset indicators, wherein each of the tokens comprises a unique identifier, wherein the audio playback device is further configured to provide one of the tokens to an associated audio source in response to receiving one of the first and second signals indicating the user selected one of the first plurality of preset indicators or one of the second plurality of preset indicators, wherein in response to receiving the token, the audio source recognizes the audio playback device as being associated with an account of the user with the audio source, and permits access to the audio source without requiring the user to enter credentials.

* * * * *